Jan. 8, 1952 M. L. HECHT ET AL 2,581,953

CIRCUIT FOR CONSTANT VOLTAGE AMPLIFIERS

Filed Oct. 9, 1948 3 Sheets-Sheet 1

INVENTOR.
MAYNARD L. HECHT
BY RICHARD SANFORD
Green & Dunn
ATTORNEYS

CIRCUIT FOR CONSTANT VOLTAGE AMPLIFIERS

INVENTOR.
MAYNARD L. HECHT
RICHARD SANFORD
BY
Greene & Durr
ATTORNEYS

CIRCUIT FOR CONSTANT VOLTAGE AMPLIFIERS

Filed Oct. 9, 1948 3 Sheets-Sheet 3

INVENTOR.
MAYNARD L. HECHT
RICHARD SANFORD
BY Greene & Durr
ATTORNEYS

Patented Jan. 8, 1952

2,581,953

UNITED STATES PATENT OFFICE 2,581,953

CIRCUIT FOR CONSTANT VOLTAGE AMPLIFIERS

Maynard L. Hecht, Jackson Heights, and Richard Sanford, Yonkers, N. Y., assignors, by mesne assignments, to Insl-X Corporation, Briarcliff Manor, N. Y., a corporation of New Jersey Application October 9, 1948, Serial No. 53,668

3 Claims. (Cl. 179—171)

This invention relates to a circuit for a constant voltage amplifier.

An object of this invention is to provide a system for amplifying a voltage to a constant predetermined higher voltage regardless of the fraction of the full load impedance on which the amplified voltage is employed.

Another object of the invention is to provide a circuit capable of maintaining a substantially constant voltage across a varying load impedance.

Another object of the invention is to provide an electronic circuit for maintaining a constant voltage across a load impedance by providing for both positive and negative feed back.

These and other objects are obtained by amplifying a given voltage in an electronic amplifier and feeding back two components of the amplified voltage that is impressed upon the load. One of the components is a positive feed back and is proportional to the current in the load and the other component comprises a negative feedback which is proportional to the potential difference across the load.

The novel features characteristic of this invention are set forth with particularity in the appended claims. The invention itself, however, both as to its organization and its method of operation, together with additional objects and advantages thereof, will best be understood from the following description of a specific embodiment when read in connection with the accompanying drawings in which:

Figure 1:
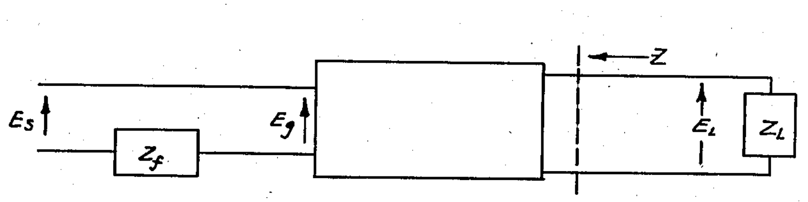
Figure 1 is a block diagram of an ordinary amplifier circuit (having an impedance $Z_f$ in series with the input).

The circuits which applicants employ to produce the constant voltage amplification are based on certain theoretical considerations which are best understood by reference to Figure 1. It is first assumed that it is possible to feed back some combination of voltage or current which will regulate the amplifier to produce a constant voltage across the load.

In Figure 1, then, $E_s$ represents the signal voltage, $E_g$ represents the effective input voltage into a transducer, $E_L$ represents the voltage across the load impedance, $Z$ is the impedance of the transducer as looked into from the load size, $Z_f$ is an impedance in series with the signal voltage and the transducer across which there is produced a voltage $E_f$ (the feed back voltage) depending on the output voltage (and/or) the output current and $Z_L$ is the load impedance.

In the circuit represented by Figure 1, the total feedback voltage $E_f$ is equal to the difference between $E_s$ and $E_g$, i. e., $$E_f=E_s-E_g \quad (1)$$

Let $Z_0$ equal the load impedance for which the total feedback voltage disappears and let $\mu$ equal the ratio of an output to input voltage of the transducer which exists if the load impedance is infinite.

Then $$E_g=\frac{-E_L}{\mu}\times\frac{Z+Z_L}{Z_L} \quad (2)$$

and $$E_s=\frac{-E_L}{\mu}\times\frac{Z+Z_0}{Z_0} \quad (3)$$

It shall be assumed that $E_g$ is, by feedback, made to change in such a way wtih varying $Z_L$ that $E_L$ stays constant.

Substituting Equations 2 and 3 in Equation 1 gives then:

$$E_f=\frac{+E_L}{\mu}\frac{Z}{Z_L}-\frac{E_L}{\mu}\frac{Z}{Z_0} \quad (4)$$

But $$\frac{E_L}{Z_L}=I_L$$

or the current through the load so that $$E_f=\frac{Z}{\mu}I_L-\frac{Z}{\mu Z_0}E_L \quad (5)$$

This Equation 5, therefore, shows a function that the feedback voltage $E_f$ must obey in order for the output voltage $E_L$ to remain constant rewardless of the fluctuation of the load impedance. The said function can therefore be divided into two components or contributions. One of said components is proportional to the load current and represents a positive current feedback. The other of said components is proportional to the voltage across the load and represents a negative voltage feedback.

If one replaces the general impedance Z in Figure 1 by an amplifier tube then:

$Z=R_p$=plate resistance and $\mu$=the amplification factor.

In the case of an output amplifier one will therefore have a constant output voltage if the following voltages are fed back simultaneously in series with the signal voltage:

$$E_f-=\frac{-R_p}{\mu R_0}E_L \qquad (6)$$

$$E_f+=\frac{+R_p}{\mu}I_L \qquad (7)$$

The voltage represented by Equation 6 can be produced in various ways such as by providing a potentiometer to divide the output voltage by the ration $R_p/\mu R_0$.

The voltage represented by Equation 7 can be produced in various way such as by letting the load current $I_L$ flow through a resistor equal to $$\frac{R_p}{\mu}$$

and employing a special transformer to isolate the positive feedback path from the high-voltage plate circuit.

Figure 2:
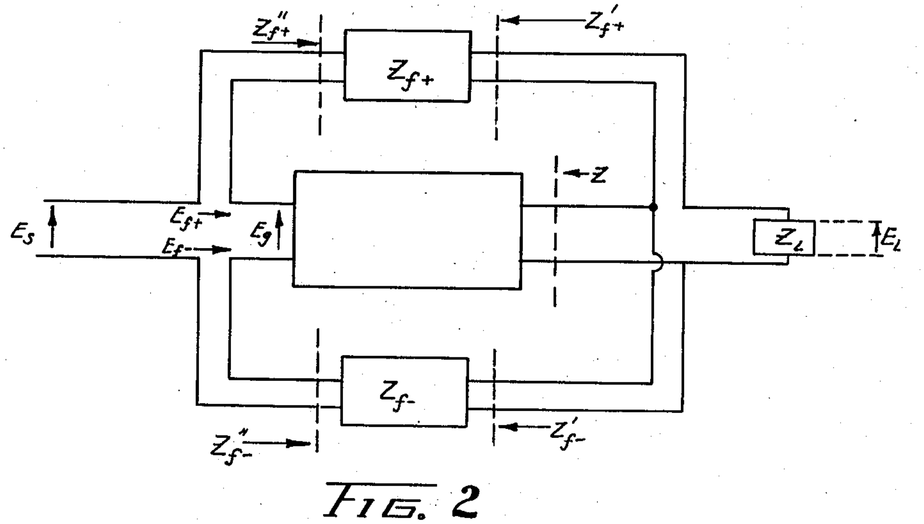
Figure 2 is a block diagram of a generalized circuit of the present invention.

A more generalized circuit diagram fulfilling the theoretical requirements required by Equations 6 and 7 is shown in Figure 2. The feedback component voltages $E_f+$ and $E_f-$ are injected in series with $E_s$. The four poles identified by the impedances $Z'_f+$, $Z''_f+$, $Z'_f-$ and $Z''_f-$ serve as transducers for the current and voltage feedback components respectively. In comparison with Figure 1 the following equivalent is noted in Figure 2:

$$Z_f=Z''_f+ +Z''_f- \qquad (8)$$

It will be recognized that the developed expressions for $E_f+$ are sufficiently correct only if $$Z'_f+ << Z_L$$

and $$Z'_f- >> Z_L \qquad (9)$$

because otherwise the feedback network would represent a considerable fraction of the total load and would have to be taken into account. The feedback network was not considered in the above derivations in so far as its effect on loading conditions is concerned.

However, the above technique for regulation is applicable also when the change of loading caused by the feedback network is not negligible and formulas have been developed for designing such circuits. The formula for the general circuit of Figure 2 taking into account finite values of the feedback primary impedances is:

$$\left.\begin{matrix}Z'_{f}-\\Z'_{f}+\end{matrix}\right\}\pm\frac{\mu-1}{2}\frac{Z_0Z''_{f-}}{Z}\pm\sqrt{\left(\frac{\mu 1-Z_0Z''_{f-}}{2Z}\right)-Z_0Z''_{f-}} \qquad (10)$$

This design equation can be derived from the following consideration.

If condition 9 is not satisfied then Equation 5 must be replaced by $$E_f=I_L\frac{Z_f'_+ +Z\left(1+\frac{Z_f'+}{Z_f'-}\right)}{\mu}-E_L\frac{Z_f'+ +Z\left(1+\frac{Z_f'+}{Z_f'-}\right)}{\mu Z_0} \qquad (5a)$$

If one want to have $E_L$ constant, then the factor $I_L$ gives the impedance through which the positive feedback current must flow and the factor of $E_L$ gives the ratio for the negative voltage feedback network.

Therefore:

$$Z'_{f+}=\frac{Z_f'_+ +Z\left(1+\frac{Z_f'+}{Z_f'-}\right)}{\mu} \qquad (5b)$$

and $$\frac{Z_f''-}{Z_f'-}=\frac{Z_f'_+ +Z\left(1+\frac{Z_f'+}{Z_f'-}\right)}{\mu Z_0} \qquad (5c)$$

Equation 5*b* and 5*c* are two simultaneous equations for $Z_f'-$ and $Z_f'+$. Their solution is represented by Equation 10. (Equation 5*a* was arrived at by using Kirchhoff's equations on the equivalent network.)

It is not necessary to return the feedback voltages solely to the input of the last stage of the amplifier. They may also be returned to previous stages as disclosed in the block diagram of Figure 3. According to Figure 3 the positive feedback is connected to the input of a driver and the negative component is fed back to the input of a pre-amplifier.

Figure 3:
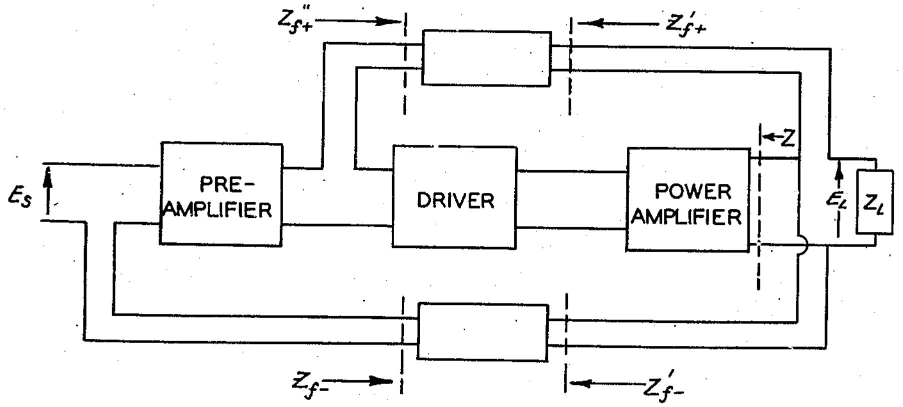
Figure 3 is a block diagram of a modified circuit.

The value of $\mu$ which one employs to calculate the feedback components in such circuits as Figure 3 will be different as all the stages between the load and the point to where the feedback voltages are applied must be taken into account.

Figure 4:
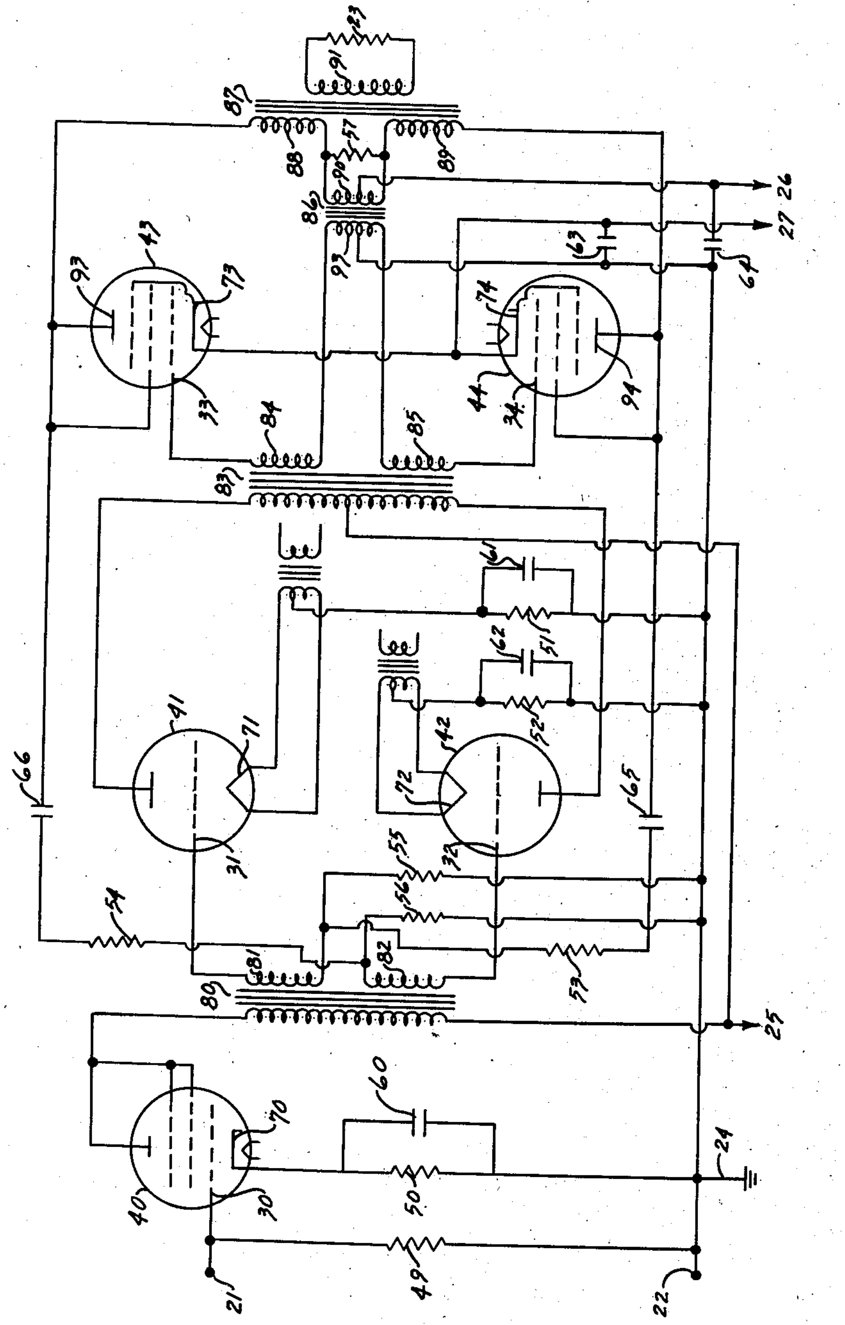
Figure 4 is a schematic diagram of an actual circuit employed.

Figure 4 discloses a circuit employing the principle of the present invention. Three stages of amplification are shown in this figure. The input to the amplifier is shown at 21, 22 and the load is shown at 23. The input at 21 is fed to the grid 30 of the tube 40. The input terminals 21 and 22 are connected by a suitable resistance 49. The input connection 22 is also connected to ground as shown at 24. A suitable resistance 50 and condenser 60 are connected between the cathode 70 of the tube 40 and ground to furnish the proper grid bias for the tube 40 while offering negligible impedance to signal frequencies.

The anode and screen and suppressor grids of the tube 40 are connected to one side of a transformer 80. The other side of the transformer 80 comprises two similar windings 81 and 82. The outputs of windings 81 and 82 are fed to the grids 31 and 32, respectively, of the tubes 41 and 42 which together comprise the second stage of amplification, the tubes 41 and 42 being connected in push-pull. The cathodes 71 and 72 of the tubes 41 and 42 are connected to ground over the center taps of the filament transformers and through the resistances 51 and 52 respectively and the condensers 61 and 62, respectively. The anodes of the tubes 41 and 42 are connected to the primary of a transformer 83. The B supply to the anodes of tubes 40, 41 and 42 is furnished by the connection at 25.

The transformer 83 has two secondary windings 84 and 85 which are connected at one end to grids 33 and 34 of tubes 43 and 44, respectively. The other ends of the secondaries 84 and 85 are connected to the secondary of transformer 86.

The anodes of the push-pull amplifier formed by tubes 43 and 44 lead to the primary of a specially constructed transformer 87. The primary of this transformer comprises two portions 88 and 89 between which are connected (in series) the primary 90 of a transformer 86. Resistance 57 is connected across the primary 90 of transformer 86. The primary 90 of the transformer 86 is connected at a center tap to the B+ supply 26 for the push-pull tubes 43 and 44.

Since the grids 33 and 34 of the tubes 43 and 44 are grounded by way of two transformer coils a bias supply 27 is provided for the cathodes 73 and 74. The condenser 63 is provided to furnish an easy path to ground for any alternating current tending to enter the bias supply 27. The condenser 64 is also provided between the B+ supply 26 and ground, for the same purpose.

For the negative feedback which must be proportional to the voltage across the load the voltage from the anode 94 of tube 44 is fed through blocking condenser 65 and resistance 53 to the low side of the secondary winding 81 of the transformer 80 and similarly the voltage from plate 93 of tube 43 is fed back through blocking condenser 66 and resistance 54 to the low side of secondary winding 82 of transformer 80.

For the positive feedback voltage which must be proportional to the current in the load, the voltage from the secondary of transformer 86 is fed back to the low sides of the secondary windings 84 and 85, respectively, of transformer 83.

The amount of negative feedback depends on the relative values of the resistances 53, 54, 55, and 56. Thus the amount of negative feedback to the secondary winding 82 will be determined by the ratio of resistance 56 to the sum of resistances 54 and 56. Similarly the amount of negative feedback to the secondary winding 81 will be determined by the ratio of resistance 55 to the sum of resistances 53 and 55.

Since the primary 90 of the transformer 86 is in series with the load transformer, it gives a voltage across the secondary 83 which will depend on the load current. If the primary impedance of the transformer 86 is equal to the factor $$\left(\frac{R_p}{\mu}\right)$$

which appears in Equation 7 which is the factor by which the load current is multiplied, then, to get the required voltage in the secondary 93 of 86, a transformation ratio of 1:1 is required.

If for practical reasons the primary of the transformer 86 is to be smaller than $$\frac{R_p}{\mu}$$

then the transformation ratio employed must be changed accordingly.

As the circuit of Figure 4 is shown, the first stage of amplification is not a part of the present invention. However, if desired either the positive or negative feedback lines or both may be connected to the grid of the first tube 40, provided that only those feedback returns are used which supply the necessary sign for the feedback voltage components.

Figure 5:
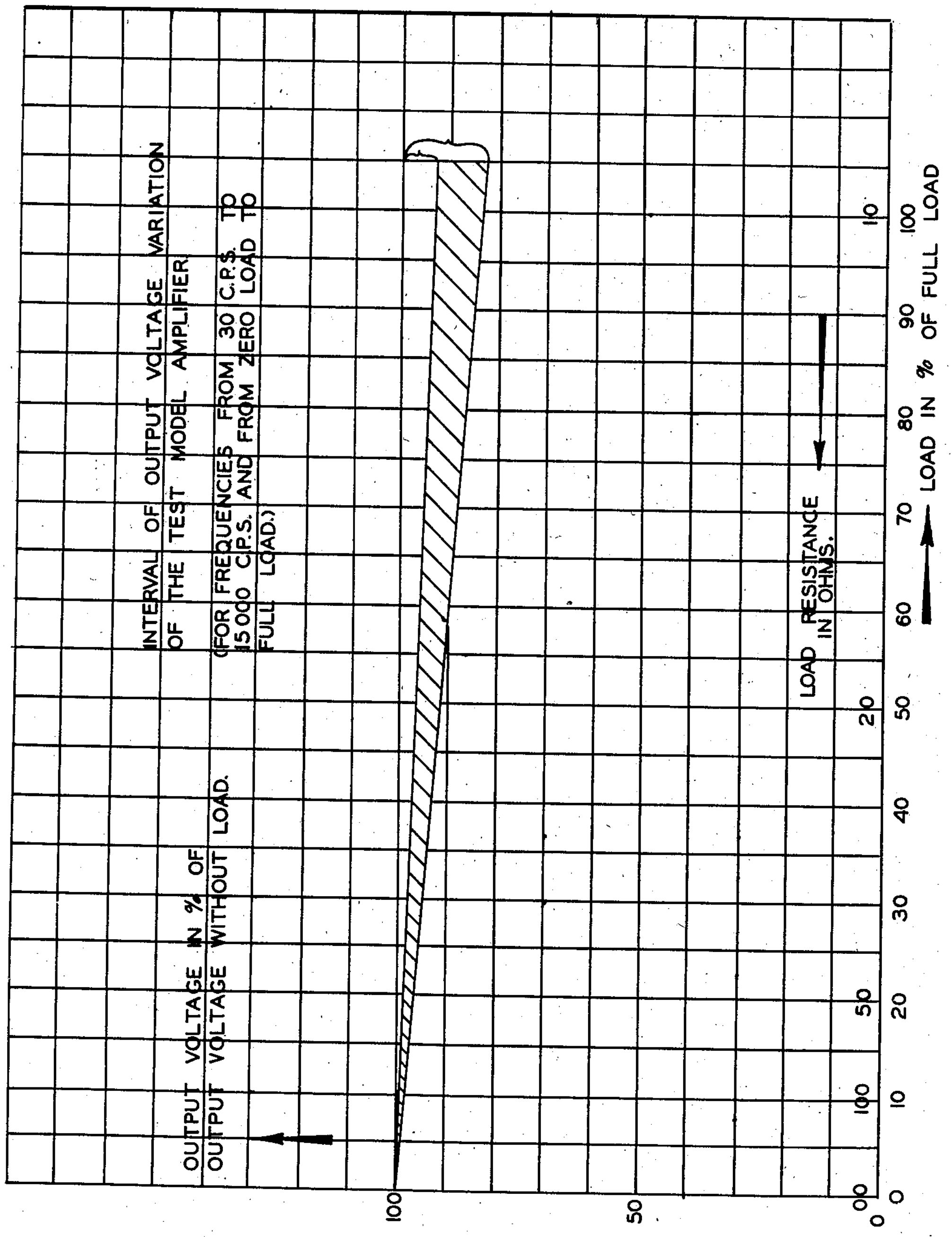
Figure 5 is a graph showing the performance of the circuit of Figure 4.

Figure 5 shows the actual performance of the circuit of Figure 4 when:

Resistance 53=resistance 54=75,000 ohms.
Resistance 55=resistance 56=10,000 ohms.
Resistance 57=1000 ohms.
Condenser 65=condenser 66=0.5 microfarad.
Tube 40 is the type 6SJ7 tube.

Tubes 41 and 42 are type 6B4G (class A amplifier.

Tubes 43 and 44 are type 6F6 (class B amplifier).

Transformer 80 is a high-fidelity transformer with a primary impedance of about 2000 ohms and a secondary impedance of 1200 ohms (grid to grid).

Transformer 83 has a primary impedance of 2000 ohms (plate to plate) and a secondary impedance of 48 ohms (grid to grid).

Transformer 86 is a transformer with a primary impedance of nominally 250 ohms and a secondary impedance of 500 ohms and is shunted by resistance 57 which is about 1000 ohms (the shunt helps to establish a secondary voltage proportional with the primary current, independent of frequency.)

Taransformer 87 has a primary impedance of 6000 ohms (plate to plate) and a secondary impedance of 10 ohms.

The voltage supply 25 is +250 volts, the voltage supply 26 is +350 volts and the supply 27 is −40 volts.

The output resistance 23 is varied up to 100 ohms and the output of the amplifier is adjusted to about 13 watts.

Figure 5 shows how the amplifier of Figure 4 operates on various frequencies from 30 to 15,000 c. p. s. and from zero load to full load. The lower line of the shaded portion represents the performance at the very low and very high frequencies. It will be seen that the output voltage is substantially constant for all of the range of frequencies and for all of the various loads. The slight decrease in the output voltage at full load may be due in part to the fact that the various constants in the circuit vary somewhat as the load or frequency varies, and it may be due in part to the fact that the impedance of the feedback circuit has not been taken into account in such a way as to employ the theoretically most favorable values for the circuit components on the basis of Equation 10. It is apparent however that the circuit produces a very satisfactory voltage regulation.

The circuit is useful wherever a constant voltage is to be supplied to a varying load.

Although certain specific embodiments of this invention have been shown and described, it will be understood that many modifications thereof are possible. This invention, therefore, is not to be restricted except insofar as is necessitated by the prior art and by the spirit of the appended claims.

We claim:

1. In a combination, plural-stage, electronic amplification circuit adapted to provide an output voltage which is substantially independent of the load within a certain predetermined load interval, and having an amplifier stage having a grid input circuit, a subsequent amplifier stage having a grid input circuit and an output coupling means beyond the said subsequent amplifier stage, the improved construction which comprises, a negative feedback circuit including a resistive component connected between said output coupling means and the grid circuit of said first named amplifier, and a positive feedback circuit including a resistive component connected between said output coupling means and the grid circuit of said subsequent amplifier, the impedance of said negative feedback circuit having a value so as to supply a voltage to the grid circuit equal to $$\frac{Z}{\mu Z_0}\times E_L$$

where $E_L$ equals the voltage desired across the load, Z is the output impedance of the amplifier $Z_0$ is the total resulting load impedance for which the voltage desired across the load is obtained without feedback and $\mu$ is the equivalent amplification factor of the amplifier between the output and the point where the feedback is applied, the impedance of said positive feedback circuit having a value so as to supply a voltage to the grid circuit equal to $$\frac{Z}{\mu}\times I_L$$

where $I_L$ is the load current Z is the output impedance of the amplifier and $\mu'$ is the amplification factor of the amplifier between the output and the point where the feedback is applied.

2. In a combination, plural-stage, electronc amplification circuit adapted to provide an output voltage which is substantially independent of the load within a certain predetermined load interval, and having an amplifier stage having a grid input circuit, a subsequent amplifier stage having a grid input circuit, and an output transformer beyond the said subsequent amplifier stage, the improved construction which comprises, a negative feedback circuit including a resistive component connected between said output transformer and the grid circuit of said first named amplifier, and a positive feedback circuit including a resistive component connected between said output transformer and the grid circuit of said subsequent amplifier, the impedance of said negative feedback circuit having a value so as to supply a voltage to the grid circuit equal to $$\frac{Z}{\mu Z_0}\times E_L$$

where $E_L$ equals the voltage desired across the load, Z is the output impedance of the amplifier $Z_0$ is the total resulting load impedance for which the voltage desired across the load is obtained without feedback and $\mu$ is equivalent amplification factor of the amplifier between the output and the point where the feedback is applied, the impedance of said positive feedback circuit having a value so as to supply a voltage to the grid circuit equal to $$\frac{Z}{\mu'}\times I_L$$

where $I_L$ is the load current Z is the output impedance of the amplifier and $\mu'$ is the amplification factor of the amplifier between the output and the point where the feedback is applied.

3. In a combination, plural-stage, electronic amplification circuit adapted to provide an output voltage which is substantially independent of the load within a certain predetermined load interval, and having an aimplifier stage having a grid input circuit, and an output transformer beyond the said subsequent amplifier stage, the improved construction which comprises, a negative feedback circuit including a resistive component connected between said output transformer and the grid circuit of said first named amplifier, and a positive feedback circuit including a resistive component connected between said output transformer and the grid circuit of said subsequent amplifier, said subsequent amplifier stage being a push-pull amplifier working into said output transformer, the impedance of said negative feedback circuit having a value so as to supply a voltage to the grid circuit equal to $$\left(\frac{Z'_f+Z\left(1+\frac{Z'_f+}{Z'_f-}\right)\times E_L}{\mu Z_0}\right)$$

and the impedance of said positive feedback circuit having a value so as to supply a voltage to the grid circuit equal to $$\left(\frac{Z'_f+Z\left(1+\frac{Z'_f+}{Z'_f-}\right)}{\mu'}\right)\times I_L$$

where $E_L$ equals the voltage desired across the load, $I_L$ equals the load current, Z equals the output impedance, $\mu$ and $\mu'$ are the equivalent amplification factors of the amplifier between the output and the points where the feedback voltages are applied, $Z_0$ is the load impedance for which the voltage desired across the output is obtained without feedback, $Z'_{f+}$ is the impedance of the positive feedback network looked at from the load side and $Z'_{f-}$ is the impedance of the negative feedback network looked at from the load side.

MAYNARD L. HECHT.
RICHARD SANFORD.

REFERENCES CITED

The following references are of record in the file of this patent:

UNITED STATES PATENTS

| Number | Name | Date |
|---|---|---|
| 1,655,557 | Mathes | Jan. 10, 1928 |
| 1,658,346 | Mathes | Feb. 7, 1928 |
| 2,173,427 | Scott | Sept. 19, 1939 |
| 2,220,770 | Mayer | Nov. 5, 1940 |
| 2,245,598 | Llewellyn | June 17, 1941 |
| 2,270,012 | Shepard | Jan. 13, 1942 |